United States Patent
Bays et al.

(10) Patent No.: US 8,863,504 B2
(45) Date of Patent: Oct. 21, 2014

(54) SYSTEM, METHOD, AND APPARATUS FOR DETERMINING AFTERTREATMENT FLUID QUALITY

(75) Inventors: Mark Bays, Columbus, IN (US); Thomas A. Grana, Columbus, IN (US); Daniel D. Wilheim, Nashville, IN (US); Stephen J. Charlton, Columbus, IN (US); John Carson Wall, Columbus, IN (US)

(73) Assignee: Cummins Inc., Columbus, IN (US)

( * ) Notice: Subject to any disclaimer, the term of this patent is extended or adjusted under 35 U.S.C. 154(b) by 575 days.

(21) Appl. No.: 12/894,965

(22) Filed: Sep. 30, 2010

(65) Prior Publication Data

US 2011/0209461 A1 Sep. 1, 2011

Related U.S. Application Data

(60) Provisional application No. 61/247,270, filed on Sep. 30, 2009.

(51) Int. Cl.
*F01N 3/00* (2006.01)
*F01N 11/00* (2006.01)
*F01N 3/20* (2006.01)

(52) U.S. Cl.
CPC ............. *F01N 3/208* (2013.01); *F01N 2610/02* (2013.01); *F01N 11/00* (2013.01); *F01N 2900/1621* (2013.01); *F01N 2900/1806* (2013.01); *Y02T 10/24* (2013.01); *F01N 2610/14* (2013.01); *Y02T 10/47* (2013.01); *F01N 2560/026* (2013.01)
USPC .................. 60/297; 60/274; 60/277; 60/286; 60/301

(58) Field of Classification Search
USPC ............ 60/274, 286, 297, 301, 303, 276, 277
See application file for complete search history.

(56) References Cited

U.S. PATENT DOCUMENTS

| | | | |
|---|---|---|---|
| 7,526,950 B2 | 5/2009 | Van Nieuwstadt et al. | |
| 8,024,921 B2 * | 9/2011 | Walz et al. ...................... | 60/286 |
| 8,166,749 B2 * | 5/2012 | Gady ............................... | 60/277 |
| 8,171,720 B2 * | 5/2012 | Wang et al. ..................... | 60/277 |
| 8,225,597 B2 * | 7/2012 | Girard et al. .................... | 60/286 |
| 8,281,572 B2 * | 10/2012 | Chi et al. ......................... | 60/286 |
| 2005/0207936 A1 | 9/2005 | Berryhill et al. | |
| 2005/0287034 A1 | 12/2005 | Wills et al. | |
| 2008/0022658 A1 | 1/2008 | Viola et al. | |
| 2008/0178575 A1 | 7/2008 | Shaikh et al. | |
| 2008/0178656 A1 | 7/2008 | Van Nieuwstadt et al. | |
| 2009/0049899 A1 | 2/2009 | Hjorsberg et al. | |

FOREIGN PATENT DOCUMENTS

WO WO 2009/071994 A2 6/2009

OTHER PUBLICATIONS

International Search Report and Written Opinion, PCT/US2010/050969, International Search Authority/KR, Cummins Inc., Jun. 14, 2011.

* cited by examiner

*Primary Examiner* — Binh Q Tran
(74) *Attorney, Agent, or Firm* — Krieg DeVault LLP

(57) ABSTRACT

A method includes determining a first $NO_x$ conversion efficiency ($\eta$) value and determining that a diesel exhaust fluid (DEF) level has increased a threshold amount. Further, the method includes determining a second $NO_x$ conversion $\eta$ value and comparing the first $NO_x$ conversion $\eta$ value and the second $NO_x$ conversion $\eta$ value, determining a $NO_x$ conversion $\eta$ change in response to comparing, and determining a DEF quality indicator in response to the $NO_x$ conversion $\eta$ change.

27 Claims, 2 Drawing Sheets

SYSTEM, METHOD, AND APPARATUS FOR DETERMINING AFTERTREATMENT FLUID QUALITY

CROSS REFERENCE TO RELATED APPLICATIONS

The present application claims the benefit of U.S. Provisional Patent Application Ser. No. 61/247,270 filed on Sep. 30, 2009, which is incorporated by reference herein in the entirety.

BACKGROUND

The technical field generally relates to monitoring fluid quality for aftertreatment systems, and more particularly but not exclusively relates to aftertreatment systems for internal combustion engines burning diesel fuel. Presently available internal combustion engines require aftertreatment systems in many cases to meet stringent emissions requirements. Some aftertreatment systems require specific fluids for operation. These fluids may require manual filling and due to their expense may be subject to bypass or manipulation, and/or subject to varying quality. One example of such a fluid is a mixture of water and urea called "diesel exhaust fluid", which is utilized in selective catalytic reduction (SCR) aftertreatment systems. When the fluid is not present or has degraded quality, the system may need to adjust to meet emissions requirements, and further the fluid quality may need to be reported for maintenance or regulatory requirements. Direct measurements and verification of fluid quality are unavailable for most fluids. Therefore, further technological developments are desirable in this area.

SUMMARY

One embodiment of the present application includes a unique apparatus for determining aftertreatment fluid quality. Other embodiments include unique aftertreatment fluid quality determining apparatuses, systems, and methods. Further embodiments, inventions, forms, objects, features, advantages, aspects, and benefits of the present application are otherwise set forth or become apparent from the description and drawings included herein.

BRIEF DESCRIPTION OF THE DRAWINGS

The description herein makes reference to the accompanying drawings wherein like reference numerals refer to like parts throughout the several views, and wherein.

DETAILED DESCRIPTION

Figure 1:
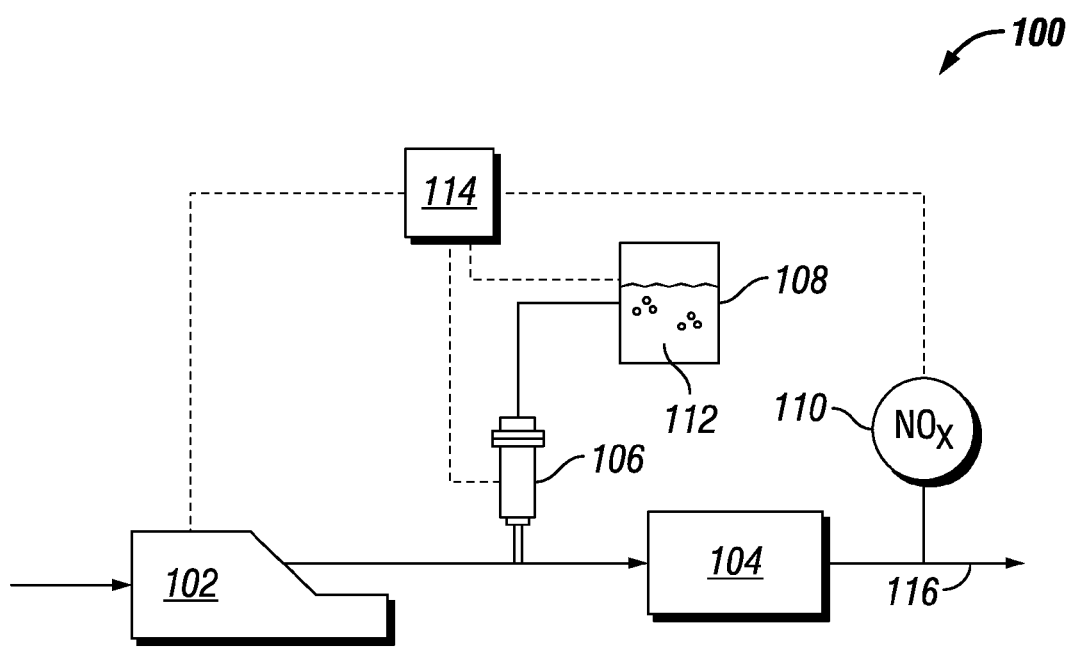
FIG. 1 is a schematic diagram of a system for determining an aftertreatment fluid quality.

For purposes of promoting an understanding of the principles of the invention, reference will now be made to the embodiments illustrated in the drawings and specific language will be used to describe the same. It will nevertheless be understood that no limitation of the scope of the invention is thereby intended, any alterations and further modifications in the illustrated device, and any further applications of the principles of the invention as illustrated therein being contemplated as would normally occur to one skilled in the art to which the invention relates.

FIG. 1 is a schematic diagram of a system 100 for determining an aftertreatment fluid quality. The system 100 includes an internal combustion engine 102 producing an exhaust stream 116, where the exhaust stream 116 includes an amount of $NO_x$. The system 100 includes a $NO_x$ conversion catalyst 104 that reduces at least a portion of the amount of $NO_x$, a reagent source 108 that stores an amount of a $NO_x$ reductant reagent 112, and a reagent injector 106 that receives the $NO_x$ reductant reagent 112 from the reagent source 108 and provides the $NO_x$ reductant reagent 112 to the exhaust stream 116 at a position upstream of the $NO_x$ conversion catalyst 104. The system 100 further includes at least one $NO_x$ sensor 110 operably coupled to the exhaust stream 116 at a position downstream of the $NO_x$ conversion catalyst 104.

The system 100 further includes a controller 114 that performs certain operations for determining an aftertreatment fluid quality, where the $NO_x$ reductant reagent 112 is the aftertreatment fluid. The $NO_x$ reductant reagent 112 may be ammonia, urea, urea with water, a diesel exhaust fluid, hydrogen, fuel, reformed fuel, or any other reducing agent understood in the art. In one embodiment, the $NO_x$ reductant reagent 112 is a urea-water mixture that is supposed to be a mixture having a specified urea concentration. The controller 114 includes modules structured to functionally execute operations to determine aftertreatment fluid quality. In certain embodiments, the controller 114 includes a $NO_x$ conversion efficiency ($\eta$) module 202, a $NO_x$ reductant reagent status module 204, and a $NO_x$ reductant reagent quality module 206. More specific descriptions of the operations of the controller 114 for exemplary embodiments are included in the section referencing FIG. 2. In certain embodiments, the controller 114 forms a portion of a processing subsystem including one or more computing devices, the devices having memory, processing, and communication hardware. The controller 114 may be a single device or a number of distributed devices, and the functions of the controller 114 may be performed by hardware or software.

Figure 2:
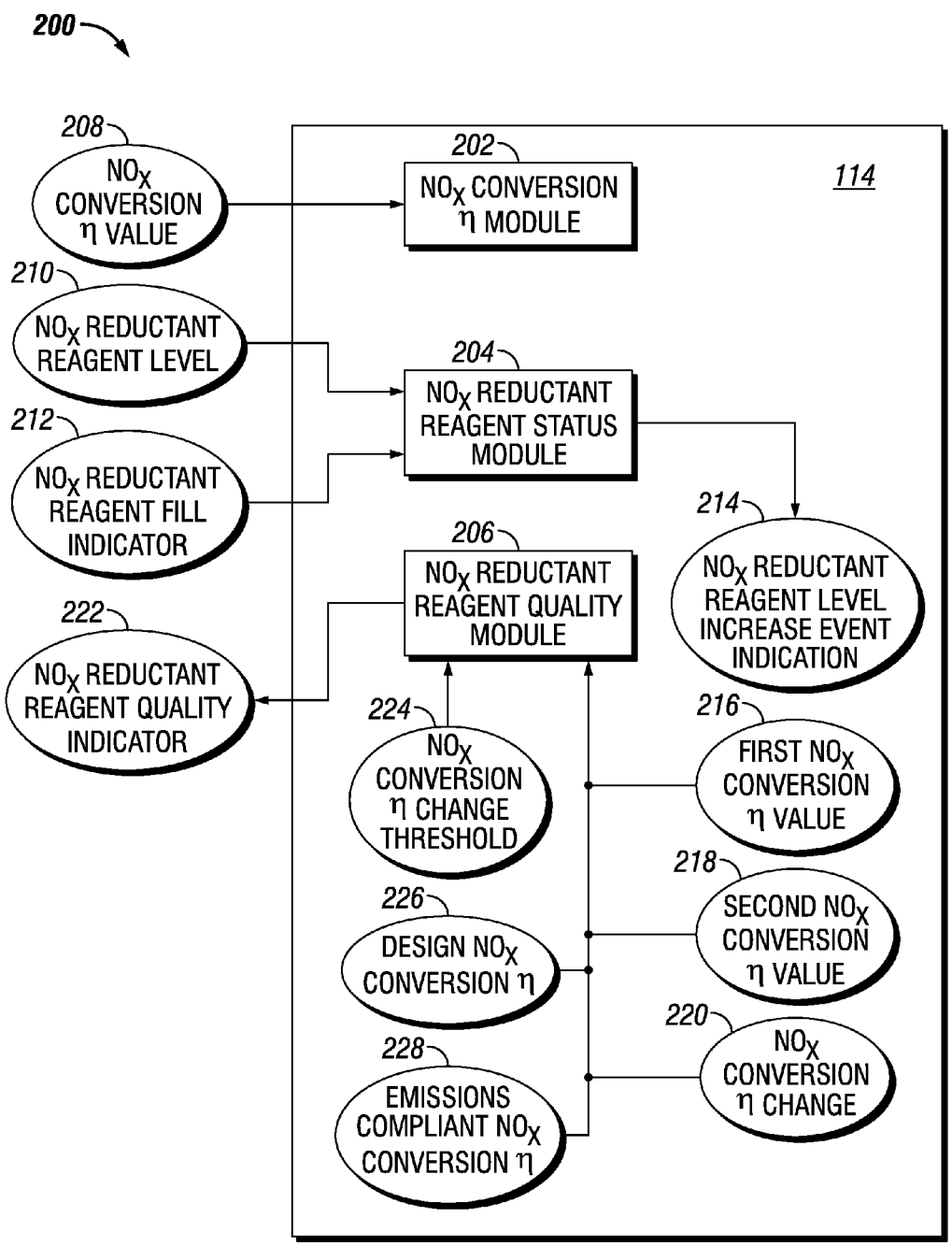
FIG. 2 is a schematic diagram of an apparatus for determining an aftertreatment fluid quality.

FIG. 2 is a schematic diagram of an apparatus 200 for determining an aftertreatment fluid quality. The apparatus 200 includes a controller 114 having a $NO_x$ conversion module 202, a $NO_x$ reductant reagent status module 204, and a $NO_x$ reductant reagent quality module 206 structured to functionally execute the operations of the controller 114. The description herein, including modules, emphasizes the structural independence of the aspects of the controller 114, and illustrates one grouping of operations and responsibilities of the controller 114. Other groupings that execute similar overall operations are understood within the scope of the present application. Modules may be implemented in hardware and/or software on computer readable medium, and modules may be distributed across various hardware or software components.

The $NO_x$ conversion efficiency ($\eta$) module 202 determines a $NO_x$ conversion $\eta$ value 208 for the $NO_x$ conversion catalyst 104. The $NO_x$ conversion $\eta$ value 208 may be determined by any method understood in the art. Non-limiting examples include measuring or modeling a $NO_x$ amount in the exhaust stream 116 upstream of the $NO_x$ conversion catalyst 104 and measuring the $NO_x$ amount in the exhaust stream 116 downstream of the $NO_x$ conversion catalyst 104, for example with a $NO_x$ sensor 110. The $NO_x$ conversion $\eta$ module 202 may receive the $NO_x$ conversion $\eta$ value 208 as a datalink or network communication, and/or may read the $NO_x$ conversion $\eta$ value 208 as a parameter stored on a computer readable medium.

The $NO_x$ reductant reagent status module 204 determines a $NO_x$ reductant reagent level 210 and/or a $NO_x$ reductant reagent fill indicator 212, and provides a $NO_x$ reductant reagent level increase event indication 214. The $NO_x$ reductant reagent status module 204 may determine the $NO_x$ reductant reagent level 210 and/or a $NO_x$ reductant reagent fill indicator 212 from a sensor level, from a fill indication value provided as a datalink or network communication, from reading a parameter stored on a computer readable medium, and/or from determining that a maintenance event of filling the reagent source 108 has occurred. For example, a maintenance parameter may be set by a computerized tool or a "pedal dance" after a filling of the reagent source 108 occurs. In other examples, a $NO_x$ reductant reagent level 210 may be tracked over time, and an increase amount greater than a nominal amount may be interpreted by the $NO_x$ reductant reagent status module 204 as a $NO_x$ reductant reagent level increase event indication 214.

The $NO_x$ reductant reagent quality module 206 compares a first $NO_x$ conversion $\eta$ value 216, stored before the $NO_x$ reductant reagent level increase event 214, to a second $NO_x$ conversion $\eta$ value 218, determined after the $NO_x$ reductant reagent level increase event 214, and determines a $NO_x$ conversion $\eta$ change 220 in response to the first $NO_x$ conversion $\eta$ value 216 and the second $NO_x$ conversion $\eta$ value 218. The comparison of the first $NO_x$ conversion $\eta$ value 216 and the second $NO_x$ conversion $\eta$ value 218 may be an absolute comparison (e.g. 95%–90%=5% $\Delta\eta$), or a relative comparison (e.g. (90%/95%)=94.7% of prior $\eta$). The $NO_x$ reductant reagent quality module 206 determines a $NO_x$ reductant reagent quality indicator 222 in response to the $NO_x$ conversion $\eta$ change 220.

In certain embodiments, the $NO_x$ reductant reagent quality module 206 determines the $NO_x$ reductant reagent quality indicator 222 regardless of the value of the first $NO_x$ conversion $\eta$ value 216, for example even where the first $NO_x$ conversion $\eta$ value 216 is a value below a design $NO_x$ conversion $\eta$ value 226, or where the first $NO_x$ conversion $\eta$ value 216 is below an emissions compliant $NO_x$ conversion $\eta$ 228. In certain embodiments, the $NO_x$ conversion $\eta$ module 202 determines whether the second $NO_x$ conversion $\eta$ value 218 is at least equal to the emissions compliant $NO_x$ conversion $\eta$ value 228, and the $NO_x$ reductant reagent quality module 206 further determines the $NO_x$ reductant reagent quality indicator 222 is "compliant degraded" in response to the $NO_x$ conversion $\eta$ module 202 determining the second $NO_x$ conversion $\eta$ value 218 is at least equal to the emissions compliant $NO_x$ conversion $\eta$ value 228 and determining the $NO_x$ conversion $\eta$ change 220 is greater than a $NO_x$ conversion $\eta$ change threshold 224. The $NO_x$ conversion $\eta$ change threshold 224 for comparing the $NO_x$ conversion $\eta$ change 220 is based upon the accepted variability in the $NO_x$ reductant reagent 112 and/or the variability in the $NO_x$ reductant reagent 112 that is desired to be detected. For example, if the $NO_x$ reductant reagent 112 is a fluid that is 32.5% urea by weight, and a solution of 25% urea by weight is the accepted level of variability, the change for comparing the $NO_x$ conversion $\eta$ change 220 is the amount of change in the $NO_x$ conversion $\eta$ value 208 that is normally expected to occur from a 25% urea solution being utilized instead of a 32.5% urea solution. In another example, if the $NO_x$ reductant reagent 112 is a fluid that is 32.5% urea by weight, and it is desired to detect anything down to a 5% urea solution, the change for comparing the $NO_x$ conversion $\eta$ change 220 is the amount of change in the $NO_x$ conversion $\eta$ value 208 that is normally expected to occur from a 5% urea solution being utilized instead of a 32.5% urea solution. The $NO_x$ reductant reagent quality module 206 may utilize multiple comparison $NO_x$ conversion $\eta$ change thresholds 224 for the $NO_x$ conversion $\eta$ change 220 to distinguish between $NO_x$ reductant reagent 112 that are degraded versus failed or non-compliant.

In certain embodiments, the $NO_x$ reductant reagent quality module 206 further determines the $NO_x$ reductant reagent quality indicator 222 as "non-compliant degraded" in response to the $NO_x$ conversion $\eta$ module 202 determining the second $NO_x$ conversion $\eta$ value 218 is not at least equal to the emissions compliant $NO_x$ conversion $\eta$ value 228 and further to determining the $NO_x$ conversion $\eta$ change 220 is greater than a $NO_x$ conversion $\eta$ change threshold 224. For example, if the $NO_x$ reduction catalyst 104 is not able to convert a compliant fraction of the $NO_x$ in the exhaust stream 116 (i.e. the $NO_x$ conversion $\eta$ value 208 is lower than the emissions compliant $NO_x$ conversion $\eta$ value 228), but there is not enough observed difference between the first $NO_x$ conversion $\eta$ value 216 and the second $NO_x$ conversion $\eta$ value 218, then the lack of compliance, in certain embodiments, is not attributed to the quality of the $NO_x$ reductant reagent 112.

In certain embodiments, the $NO_x$ conversion $\eta$ module 202 further determines whether the first $NO_x$ conversion $\eta$ value 216 is at least equal to the emissions compliant $NO_x$ conversion $\eta$ value 228. The $NO_x$ reductant reagent quality module 206 further determines the $NO_x$ reductant reagent quality indicator 222 is "degraded causing non-compliance" in response to the $NO_x$ conversion $\eta$ module 202 determining the second $NO_x$ conversion $\eta$ value 218 is not at least equal to the emissions compliant $NO_x$ conversion $\eta$ value 228, determining that the first $NO_x$ conversion $\eta$ value 216 is at least equal to the emissions compliant $NO_x$ conversion $\eta$ value 228, and determining the $NO_x$ conversion $\eta$ change 220 is greater than a $NO_x$ conversion $\eta$ change threshold 224. The $NO_x$ reductant reagent quality module 206 further determines the $NO_x$ reductant reagent quality indicator 222 is "compliant degraded" in response to the $NO_x$ conversion $\eta$ module 202 determining the second $NO_x$ conversion $\eta$ value 218 is at least equal to the emissions compliant $NO_x$ conversion $\eta$ value 228, determining that the first $NO_x$ conversion $\eta$ value 216 is at least equal to the emissions compliant $NO_x$ conversion $\eta$ value 228, and determining the $NO_x$ conversion $\eta$ change 220 is greater than a $NO_x$ conversion $\eta$ change threshold 224.

The $NO_x$ reductant reagent quality module 206 further determines that the $NO_x$ reductant reagent quality indicator 222 is "enriched" in response to the $NO_x$ conversion $\eta$ module 202 determining the second $NO_x$ conversion $\eta$ value 218 is at least equal to the emissions compliant $NO_x$ conversion $\eta$ value 228, determining that the first $NO_x$ conversion $\eta$ value 216 is not at least equal to the emissions compliant $NO_x$ conversion $\eta$ value 228, and determining the $NO_x$ conversion $\eta$ change 220 is greater than a $NO_x$ conversion $\eta$ change threshold 224. The $NO_x$ reductant reagent quality module 206 further determines the $NO_x$ reductant reagent quality indicator 222 is "enriched" in response to the $NO_x$ conversion $\eta$ change 220 having a positive magnitude, and determines the $NO_x$ reductant reagent quality indicator 222 is "diluted" in response to the $NO_x$ conversion $\eta$ change 220 having a negative magnitude.

The names described for the $NO_x$ reductant reagent quality indicator 222 are exemplary and non-limiting. Equivalent names, names conveying similar information, and numbers stored on computer readable medium that have a translatable meaning to similar information are contemplated herein. The sign conventions utilized, such as the $NO_x$ reductant reagent quality indicator 222 being "diluted" where the $NO_x$ conversion $\eta$ change 220 has a negative magnitude, are of course reversible.

Table 1 illustrates certain non-limiting behaviors of the $NO_x$ reductant reagent quality module 206 in response to various parameters in the system 100. Within Table 1, the numbers refer to elements from FIG. 2, for example 220 represents the $NO_x$ conversion η change 220, and the indicator "- - -" illustrates that the parameter or value is not considered for the example situation.

TABLE 1

Exemplary behaviors of the $NO_x$ reductant reagent quality module 206.

| 216 > 228 | 218 > 228 | 220 > 224 | Sign of 220 | Value of 222 |
|---|---|---|---|---|
| YES | YES | YES | NEG | Compliant degraded (diluted) |
| YES | NO | YES | NEG | Degraded (diluted) causing non-compliance |
| NO | NO | YES | NEG | Non-compliant degraded (diluted) |
| NO | YES | YES | POS | Enriched |
| — | — | YES | POS | Enriched |
| — | — | YES | NEG | Diluted |
| — | — | NO | — | Store current 208 as next 216, exit |

In the example provided in Table 1, where the magnitude of the $NO_x$ conversion η change 220 indicates that the fluid quality has not changed in response to the $NO_x$ reductant reagent level increase event 214, the $NO_x$ reductant reagent quality module 206 may store the present $NO_x$ conversion η value 208 as the first $NO_x$ conversion η value 216 and the controller 114 may allow the fluid quality algorithm to exit. The first $NO_x$ conversion η value 216 may be updated between $NO_x$ reductant reagent level increase events 214, for example with a filtered value of the observed $NO_x$ conversion H values 208, or the first $NO_x$ conversion η value 216 may be held constant until another $NO_x$ reductant reagent level increase event 214 is detected.

An exemplary procedure for determining an exhaust treatment fluid quality is described. The exemplary procedure includes an operation to determining a first parameter value corresponding to a first $NO_x$ conversion efficiency (η) value. The procedure further includes an operation to determine that an exhaust treatment fluid level has increased a threshold amount, and an operation to determine a second parameter value corresponding to a second $NO_x$ conversion η value. The procedure includes an operation to compare the first parameter value and the second parameter value, to determine a $NO_x$ conversion η change in response to comparing, and to determine an exhaust treatment fluid quality indicator in response to the $NO_x$ conversion η change.

The exemplary procedure includes an operation to determine the exhaust treatment fluid quality indicator as enriched in response to the $NO_x$ conversion η change having a positive magnitude, and to determine the exhaust treatment fluid quality indicator as diluted in response to the $NO_x$ conversion η change having a negative magnitude. In certain embodiments, the exhaust treatment fluid is a $NO_x$ reductant reagent. The $NO_x$ reductant reagent can include ammonia, urea, urea with water, a diesel exhaust fluid, hydrogen, fuel, and/or reformed fuel.

As is evident from the figures and text presented above, a variety of embodiments according to the present invention are contemplated.

One exemplary embodiment is a method including determining a first $NO_x$ conversion efficiency value, determining that a diesel exhaust fluid (DEF) level has increased a threshold amount, and determining a second $NO_x$ conversion efficiency value. The method further includes comparing the first $NO_x$ conversion efficiency value and the second $NO_x$ conversion efficiency value, determining a $NO_x$ conversion efficiency change in response to the comparing, and determining a DEF quality indicator in response to the $NO_x$ conversion efficiency change.

Certain embodiments of the method include one or more of the following described operations. Operations may be re-ordered, combined, split, omitted, or substituted. The method includes determining that the DEF level has increased the threshold amount by determining that a DEF tank has been filled. The first $NO_x$ conversion efficiency value may be a value that is below a design $NO_x$ conversion efficiency value.

In further embodiments, the method includes determining whether the second $NO_x$ conversion efficiency value is at least equal to an emissions compliant $NO_x$ conversion efficiency value. In response to determining the second $NO_x$ conversion efficiency value is at least equal to the emissions compliant $NO_x$ conversion efficiency value and determining the $NO_x$ conversion efficiency change is greater than a $NO_x$ conversion η change threshold, the method includes determining the DEF quality indicator is compliant degraded. In response to determining the second $NO_x$ conversion efficiency value is not at least equal to the emissions compliant $NO_x$ conversion efficiency value and determining the $NO_x$ conversion efficiency change is greater than a $NO_x$ conversion η change threshold, the method includes determining the DEF quality indicator is non-compliant degraded. The method further includes determining whether the first $NO_x$ conversion efficiency value is at least equal to the emissions compliant $NO_x$ conversion efficiency value.

In response to determining the second $NO_x$ conversion efficiency value is not at least equal to the emissions compliant $NO_x$ conversion efficiency value, determining that the first $NO_x$ conversion efficiency value is at least equal to the emissions compliant $NO_x$ conversion efficiency value, and determining the $NO_x$ conversion efficiency change is greater than a $NO_x$ conversion η change threshold, the method includes determining the DEF quality indicator is degraded causing non-compliance. In response to determining the second $NO_x$ conversion efficiency value is at least equal to the emissions compliant $NO_x$ conversion efficiency value, determining that the first $NO_x$ conversion efficiency value is at least equal to the emissions compliant $NO_x$ conversion efficiency value, and determining the $NO_x$ conversion efficiency change is greater than a $NO_x$ conversion η change threshold, the method includes determining the DEF quality indicator is compliant degraded. In response to determining the second $NO_x$ conversion efficiency value is at least equal to the emissions compliant $NO_x$ conversion efficiency value, determining that the first $NO_x$ conversion efficiency value is not at least equal to the emissions compliant $NO_x$ conversion efficiency value, and determining the $NO_x$ conversion efficiency change is greater than a $NO_x$ conversion η change threshold, the method includes determining the DEF quality indicator is enriched.

In certain embodiments, the method further includes determining the DEF quality indicator is enriched in response to the $NO_x$ conversion efficiency change having a positive magnitude, and determining the DEF quality indicator is diluted in response to the $NO_x$ conversion efficiency change having a negative magnitude.

Another exemplary embodiment is a system including an internal combustion engine producing an exhaust stream, wherein the exhaust stream includes an amount of $NO_x$, a $NO_x$ conversion catalyst that reduces at least a portion of the amount of $NO_x$, a reagent source that stores an amount of a $NO_x$ reductant reagent and a reagent injector that receives the $NO_x$ reductant reagent from the reagent source and provides the $NO_x$ reductant reagent to the exhaust stream at a position upstream of the $NO_x$ conversion catalyst. The system further includes at least one $NO_x$ sensor operably coupled to the exhaust stream at a position downstream of the $NO_x$ conversion catalyst, and a controller structured to perform certain operations for determining an aftertreatment fluid quality. The controller includes modules structured to functionally execute the operations, and in certain embodiments includes a $NO_x$ conversion efficiency module, a $NO_x$ reductant reagent status module, and a $NO_x$ reductant reagent quality module. The $NO_x$ conversion efficiency module determines a $NO_x$ conversion efficiency value for the $NO_x$ conversion catalyst. The $NO_x$ reductant reagent status module determines a $NO_x$ reductant reagent level and/or a $NO_x$ reductant reagent fill indicator, and provides a $NO_x$ reductant reagent level increase event indication. The $NO_x$ reductant reagent quality module compares a first $NO_x$ conversion efficiency value stored before the $NO_x$ reductant reagent level increase event to a second $NO_x$ conversion efficiency value determined after the $NO_x$ reductant reagent level increase event, determines a $NO_x$ conversion efficiency change in response to the first $NO_x$ conversion efficiency value and the second $NO_x$ conversion efficiency value, and determines a $NO_x$ reductant reagent quality indicator in response to the $NO_x$ conversion efficiency change. In certain embodiments, the $NO_x$ reductant reagent comprises a DEF.

Certain embodiments of the system include one or more of the following described features. Features may be combined, split, omitted, or substituted. The system includes the first $NO_x$ conversion efficiency value as a value that is below a design $NO_x$ conversion efficiency value. The $NO_x$ conversion efficiency module may further determine whether the second $NO_x$ conversion efficiency value is at least equal to an emissions compliant $NO_x$ conversion efficiency value. The $NO_x$ reductant reagent quality module further determines the $NO_x$ reductant reagent quality indicator is compliant degraded in response to the $NO_x$ conversion efficiency module determining the second $NO_x$ conversion efficiency value is at least equal to the emissions compliant $NO_x$ conversion efficiency value and determining the $NO_x$ conversion efficiency change is greater than a $NO_x$ conversion $\eta$ change threshold.

The $NO_x$ reductant reagent quality module further determines the $NO_x$ reductant reagent quality indicator is non-compliant degraded in response to the $NO_x$ conversion efficiency module determining the second $NO_x$ conversion efficiency value is not at least equal to the emissions compliant $NO_x$ conversion efficiency value and determining the $NO_x$ conversion efficiency change is greater than a $NO_x$ conversion $\eta$ change threshold. The $NO_x$ conversion efficiency module further determines whether the first $NO_x$ conversion efficiency value is at least equal to the emissions compliant $NO_x$ conversion efficiency value. The $NO_x$ reductant reagent quality module further determines the $NO_x$ reductant reagent quality indicator is degraded causing non-compliance in response to the $NO_x$ conversion efficiency module determining the second $NO_x$ conversion efficiency value is not at least equal to the emissions compliant $NO_x$ conversion efficiency value, determining that the first $NO_x$ conversion efficiency value is at least equal to the emissions compliant $NO_x$ conversion efficiency value, and determining the $NO_x$ conversion efficiency change is greater than a $NO_x$ conversion $\eta$ change threshold.

The $NO_x$ reductant reagent quality module further determine the $NO_x$ reductant reagent quality indicator is compliant degraded in response to the $NO_x$ conversion efficiency module determining the second $NO_x$ conversion efficiency value is at least equal to the emissions compliant $NO_x$ conversion efficiency value, determining that the first $NO_x$ conversion efficiency value is at least equal to the emissions compliant $NO_x$ conversion efficiency value, and determining the $NO_x$ conversion efficiency change is greater than a $NO_x$ conversion $\eta$ change threshold. The $NO_x$ reductant reagent quality module further determine the $NO_x$ reductant reagent quality indicator is enriched in response to the $NO_x$ conversion efficiency module determining the second $NO_x$ conversion efficiency value is at least equal to the emissions compliant $NO_x$ conversion efficiency value, determining that the first $NO_x$ conversion efficiency value is not at least equal to the emissions compliant $NO_x$ conversion efficiency value, and determining the $NO_x$ conversion efficiency change is greater than a $NO_x$ conversion $\eta$ change threshold. The $NO_x$ reductant reagent quality module further determines the $NO_x$ reductant reagent quality indicator is enriched in response to the $NO_x$ conversion efficiency change having a positive magnitude, and determines the $NO_x$ reductant reagent quality indicator is diluted in response to the $NO_x$ conversion efficiency change having a negative magnitude.

While the invention has been described in connection with what is presently considered to be the most practical and preferred embodiment, it is to be understood that the invention is not to be limited to the disclosed embodiment(s), but on the contrary, is intended to cover various modifications and equivalent arrangements included within the spirit and scope of the appended claims, which scope is to be accorded the broadest interpretation so as to encompass all such modifications and equivalent structures as permitted under the law. Furthermore it should be understood that while the use of the word preferable, preferably, or preferred in the description above indicates that feature so described may be more desirable, it nonetheless may not be necessary and any embodiment lacking the same may be contemplated as within the scope of the invention, that scope being defined by the claims that follow. In reading the claims it is intended that when words such as "a," "an," "at least one" and "at least a portion" are used, there is no intention to limit the claim to only one item unless specifically stated to the contrary in the claim. Further, when the language "at least a portion" and/or "a portion" is used the item may include a portion and/or the entire item unless specifically stated to the contrary.

What is claimed is:

1. A method, comprising:
   determining a first $NO_x$ conversion efficiency ($\eta$) value;
   increasing a diesel exhaust fluid (DEF) level of a DEF in a DEF storage source a threshold amount;
   determining a second $NO_x$ conversion $\eta$ value when the DEF level has increased the threshold amount;
   determining whether the second $NO_x$ conversion $\eta$ value is at least equal to an emissions compliant $NO_x$ conversion $\eta$ value; and
   comparing the first $NO_x$ conversion $\eta$ value and the second $NO_x$ conversion $\eta$ value, determining a $NO_x$ conversion $\eta$ change in response to comparing, and determining a DEF quality indicator associated with a $NO_x$ reduction capability of the DEF in the DEF storage source in response to the $NO_x$ conversion $\eta$ change, wherein in response to determining the second $NO_x$ conversion value is at least equal to the emissions compliant $NO_x$ conversion $\eta$ value and determining the $NO_x$ conversion $\eta$ change is greater than a $NO_x$ conversion $\eta$ change threshold, determining the DEF quality indicator is compliant degraded.

2. The method of claim 1, wherein determining that the DEF level has increased the threshold amount comprises determining that the DEF storage source has been filled.

3. The method of claim 1, wherein the first $NO_x$ conversion $\eta$ value is a value that is below a design $NO_x$ conversion $\eta$ value.

4. The method of claim 1, further comprising:
in response to determining the second $NO_x$ conversion $\eta$ value is not at least equal to the emissions compliant $NO_x$ conversion $\eta$ value and determining the $NO_x$ conversion $\eta$ change is greater than the $NO_x$ conversion $\eta$ change threshold;
determining the DEF quality indicator is non-compliant degraded.

5. The method of claim 1, further comprising determining whether the first $NO_x$ conversion $\eta$ value is at least equal to the emissions compliant $NO_x$ conversion $\eta$ value.

6. The method of claim 5, further comprising:
in response to determining the second $NO_x$ conversion $\eta$ value is not at least equal to the emissions compliant $NO_x$ conversion $\eta$ value, determining that the first $NO_x$ conversion $\eta$ value is at least equal to the emissions compliant $NO_x$ conversion $\eta$ value, and determining the $NO_x$ conversion $\eta$ change is greater than the $NO_x$ conversion $\eta$ change threshold;
determining the DEF quality indicator is degraded causing non-compliance.

7. The method of claim 5, further comprising:
in response to determining the second $NO_x$ conversion $\eta$ value is at least equal to the emissions compliant $NO_x$ conversion $\eta$ value, determining that the first $NO_x$ conversion $\eta$ value is at least equal to the emissions compliant $NO_x$ conversion $\eta$ value, and determining the $NO_x$ conversion $\eta$ change is greater than the $NO_x$ conversion $\eta$ change threshold;
determining the DEF quality indicator is compliant degraded.

8. The method of claim 5, further comprising:
in response to determining the second $NO_x$ conversion $\eta$ value is at least equal to the emissions compliant $NO_x$ conversion $\eta$ value, determining that the first $NO_x$ conversion $\eta$ value is not at least equal to the emissions compliant $NO_x$ conversion $\eta$ value, and determining the $NO_x$ conversion $\eta$ change is greater than the $NO_x$ conversion $\eta$ change threshold;
determining the DEF quality indicator is enriched.

9. The method of claim 5, further determining the DEF quality indicator as enriched in response to the $NO_x$ conversion $\eta$ change having a positive magnitude and determining the DEF quality indicator as diluted in response to the $NO_x$ conversion $\eta$ change having a negative magnitude.

10. A system, comprising:
an internal combustion engine producing an exhaust stream, the exhaust stream including an amount of $NO_x$;
a $NO_x$ conversion catalyst that reduces at least a portion of the amount of $NO_x$;
a reagent source that stores an amount of a $NO_x$ reductant reagent and a reagent injector that receives the $NO_x$ reductant reagent from the reagent source and provides the $NO_x$ reductant reagent to the exhaust stream at a position upstream of the $NO_x$ conversion catalyst;
at least one $NO_x$ sensor operably coupled to the exhaust stream at a position downstream of the $NO_x$ conversion catalyst; and
a controller, comprising:
a $NO_x$ conversion efficiency ($\eta$) module structured to determine a $NO_x$ conversion $\eta$ value for the $NO_x$ conversion catalyst;
a $NO_x$ reductant reagent status module structured to determine one of a $NO_x$ reductant reagent level and a $NO_x$ reductant reagent fill indicator of the $NO_x$ reductant reagent in the reagent source, and to provide a $NO_x$ reductant reagent level increase event indication of the $NO_x$ reductant reagent in the reagent source;
a $NO_x$ reductant reagent quality module structured to compare a first $NO_x$ conversion $\eta$ value stored before the $NO_x$ reductant reagent level increase event to a second $NO_x$ conversion $\eta$ value determined after the $NO_x$ reductant reagent level increase event, to determine a $NO_x$ conversion $\eta$ change in response to the first $NO_x$ conversion $\eta$ value and the second $NO_x$ conversion $\eta$ value, and to determine a $NO_x$ reductant reagent quality indicator associated with a $NO_x$ reduction capability of the $NO_x$ reductant reagent in the reagent source in response to the $NO_x$ conversion $\eta$ change; and
wherein the $NO_x$ reductant reagent quality module is further structured to determine the $NO_x$ reductant reagent quality indicator as enriched in response to the $NO_x$ conversion $\eta$ change having a positive magnitude and to determine the $NO_x$ reductant reagent quality indicator as diluted in response to the $NO_x$ conversion efficiency change having a negative magnitude.

11. The system of claim 10, wherein the $NO_x$ reductant reagent comprises a diesel exhaust fluid (DEF).

12. The system of claim 10, wherein the first $NO_x$ conversion $\eta$ value is a value that is below a design $NO_x$ conversion $\eta$ value.

13. The system of claim 10, wherein the $NO_x$ conversion $\eta$ module is further structured to determine whether the second $NO_x$ conversion $\eta$ value is at least equal to an emissions compliant $NO_x$ conversion $\eta$ value.

14. The system of claim 13, wherein the $NO_x$ reductant reagent quality module is further structured to:
in response to the $NO_x$ conversion $\eta$ module determining the second $NO_x$ conversion $\eta$ value is at least equal to the emissions compliant $NO_x$ conversion $\eta$ value and determining the $NO_x$ conversion $\eta$ change is greater than a $NO_x$ conversion $\eta$ change threshold;
determine the $NO_x$ reductant reagent quality indicator is compliant degraded.

15. The system of claim 13, wherein the $NO_x$ reductant reagent quality module is further structured to:
in response to the $NO_x$ conversion $\eta$ module determining the second $NO_x$ conversion $\eta$ value is not at least equal to the emissions compliant $NO_x$ conversion $\eta$ value and determining the $NO_x$ conversion $\eta$ change is greater than a $NO_x$ conversion $\eta$ change threshold;
determine the $NO_x$ reductant reagent quality indicator is non-compliant degraded.

16. The system of claim 13, wherein the $NO_x$ conversion $\eta$ module is further structured to determine whether the first $NO_x$ conversion $\eta$ value is at least equal to the emissions compliant $NO_x$ conversion $\eta$ value.

17. The system of claim 16, wherein the $NO_x$ reductant reagent quality module is further structured to:
in response to the $NO_x$ conversion $\eta$ module determining the second $NO_x$ conversion $\eta$ value is not at least equal to the emissions compliant $NO_x$ conversion $\eta$ value, determining that the first $NO_x$ conversion $\eta$ value is at least equal to the emissions compliant $NO_x$ conversion $\eta$ value, and determining the $NO_x$ conversion $\eta$ change is greater than a $NO_x$ conversion $\eta$ change threshold;

determine the $NO_x$ reductant reagent quality indicator is degraded causing non-compliance.

18. The system of claim 16, wherein the $NO_x$ reductant reagent quality module is further structured to:

in response to the $NO_x$ conversion $\eta$ module determining the second $NO_x$ conversion $\eta$ value is at least equal to the emissions compliant $NO_x$ conversion $\eta$ value, determining that the first $NO_x$ conversion $\eta$ value is at least equal to the emissions compliant $NO_x$ conversion $\eta$ value, and determining the $NO_x$ conversion $\eta$ change is greater than a $NO_x$ conversion $\eta$ change threshold;

determine the $NO_x$ reductant reagent quality indicator is compliant degraded.

19. A method, comprising:

determining a first parameter value corresponding to a first $NO_x$ conversion efficiency ($\eta$) value;

increasing an exhaust treatment fluid level in an exhaust treatment fluid storage source a threshold amount;

determining a second parameter value corresponding to a second $NO_x$ conversion $\eta$ value when the exhaust treatment fluid level has increased the threshold amount; and comparing the first parameter value and the second parameter value, determining a $NO_x$ conversion $\eta$ change in response to comparing, and determining an exhaust treatment fluid quality indicator associated with a $NO_x$ reduction capability of the exhaust treatment fluid in the exhaust treatment fluid storage source in response to the $NO_x$ conversion $\eta$ change, and further determining the exhaust treatment fluid quality indicator as enriched in response to the $NO_x$ conversion $\eta$ change having a positive magnitude and determining the exhaust treatment fluid quality indicator as diluted in response to the $NO_x$ conversion $\eta$ change having a magnitude.

20. The method of claim 19, wherein the exhaust treatment fluid comprises a $NO_x$ reductant reagent.

21. The method of claim 20, wherein the $NO_x$ reductant reagent comprises a reductant selected from the reductants consisting of: ammonia, urea, urea with water, a diesel exhaust fluid, hydrogen, fuel, and reformed fuel.

22. An apparatus, comprising:

a $NO_x$ conversion efficiency ($\eta$) module structured to determine a $NO_x$ conversion $\eta$ value for a $NO_x$ conversion catalyst;

a $NO_x$ reductant reagent status module structured to determine one of a $NO_x$ reductant reagent level and a $NO_x$ reductant reagent fill indicator of a $NO_x$ reductant reagent in a storage source, and to provide a $NO_x$ reductant reagent level increase event indication of the $NO_x$ reductant reagent in the storage source; and a $NO_x$ reductant reagent quality module structured to compare a first $NO_x$ conversion $\eta$ value stored before the $NO_x$ reductant reagent level increase event to a second $NO_x$ conversion $\eta$ value determined after the $NO_x$ reductant reagent level increase event, to determine a $NO_x$ conversion $\eta$ change in response to the first $NO_x$ conversion $\eta$ value and the second $NO_x$ conversion $\eta$ value, and to determine a $NO_x$ reductant reagent quality indicator associated with a $NO_x$ reduction capability of the $NO_x$ reductant reagent in the storage source in response to the $NO_x$ conversion $\eta$ change, wherein the $NO_x$ conversion $\eta$ module is further structured to determine whether the second $NO_x$ conversion $\eta$ value is at least equal to an emissions compliant $NO_x$ conversion $\eta$ value, and in response to the $NO_x$ conversion $\eta$ module determining the second $NO_x$ conversion $\eta$ value is at least equal to the emissions compliant $NO_x$ conversion $\eta$ value and determining the $NO_x$ conversion $\eta$ change is greater than a $NO_x$ conversion $\eta$ change threshold, determine the $NO_x$ reductant reagent quality indicator is compliant degraded.

23. The apparatus of claim 22, wherein the first $NO_x$ conversion $\eta$ value is a value that is below a design $NO_x$ conversion $\eta$ value.

24. The apparatus of claim 22, wherein the $NO_x$ reductant reagent quality module is further structured to:

in response to the $NO_x$ conversion $\eta$ module determining the second $NO_x$ conversion $\eta$ value is not at least equal to the emissions compliant $NO_x$ conversion $\eta$ value and determining the $NO_x$ conversion $\eta$ change is greater than the $NO_x$ conversion $\eta$ change threshold;

determine the $NO_x$ reductant reagent quality indicator is non-compliant degraded.

25. The apparatus of claim 22, wherein the $NO_x$ conversion $\eta$ module is further structured to determine whether the first $NO_x$ conversion $\eta$ value is at least equal to the emissions compliant $NO_x$ conversion $\eta$ value, and wherein the $NO_x$ reductant reagent quality module is further structured to:

in response to the $NO_x$ conversion $\eta$ module determining the second $NO_x$ conversion $\eta$ value is not at least equal to the emissions compliant $NO_x$ conversion $\eta$ value, determining that the first $NO_x$ conversion $\eta$ value is at least equal to the emissions compliant $NO_x$ conversion $\eta$ value, and determining the $NO_x$ conversion $\eta$ change is greater than the $NO_x$ conversion $\eta$ change threshold;

determine the $NO_x$ reductant reagent quality indicator is degraded causing non-compliance.

26. The apparatus of claim 22, wherein the $NO_x$ conversion $\eta$ module is further structured to determine whether the first $NO_x$ conversion $\eta$ value is at least equal to the emissions compliant $NO_x$ conversion $\eta$ value, and wherein the $NO_x$ reductant reagent quality module is further structured to:

in response to the $NO_x$ conversion $\eta$ module determining the second $NO_x$ conversion $\eta$ value is at least equal to the emissions compliant $NO_x$ conversion $\eta$ value, determining that the first $NO_x$ conversion $\eta$ value is at least equal to the emissions compliant $NO_x$ conversion $\eta$ value, and determining the $NO_x$ conversion $\eta$ change is greater than the $NO_x$ conversion $\eta$ change threshold;

determine the $NO_x$ reductant reagent quality indicator is compliant degraded.

27. The apparatus of claim 22, wherein the $NO_x$ conversion $\eta$ module is further structured to determine whether the first $NO_x$ conversion $\eta$ value is at least equal to the emissions compliant $NO_x$ conversion $\eta$ value, and wherein the $NO_x$ reductant reagent quality module is further structured to:

in response to the $NO_x$ conversion efficiency module determining the second $NO_x$ conversion efficiency value is at least equal to the emissions compliant $NO_x$ conversion efficiency value, determining that the first $NO_x$ conversion $\eta$ value is not at least equal to the emissions compliant $NO_x$ conversion efficiency value, and determining the $NO_x$ conversion efficiency change is greater than the $NO_x$ conversion $\eta$ change threshold;

determine the $NO_x$ reductant reagent quality indicator is enriched.

* * * * *